July 11, 1961 O. KORNEI 2,991,511

METHOD OF MAKING MULTICHANNEL MAGNETIC TRANSDUCER HEADS

Filed Dec. 20, 1955 2 Sheets-Sheet 1

INVENTOR.
OTTO KORNEI
BY
William J. Flynn
ATTORNEY

July 11, 1961 O. KORNEI 2,991,511
METHOD OF MAKING MULTICHANNEL MAGNETIC TRANSDUCER HEADS
Filed Dec. 20, 1955 2 Sheets-Sheet 2

INVENTOR.
OTTO KORNEI
BY
William J. Flynn
ATTORNEY 2,991,511
METHOD OF MAKING MULTICHANNEL MAGNETIC TRANSDUCER HEADS

Otto Kornei, Cleveland Heights, Ohio, assignor to Clevite Corporation, Cleveland, Ohio, a corporation of Ohio Filed Dec. 20, 1955, Ser. No. 554,371
4 Claims. (Cl. 18—59)

This invention relates to a method of producing a multichannel magnetic transducer head unit especially adapted for the recording and reproduction of extremely high frequency signals.

The problem of making effective multichannel magnetic recordings and reproductions of extremely high frequency signals without requiring excessive record speed imposes stringent performance requirements which cannot be met by multichannel magnetic head units of the type used heretofore. Among the most important requirements is the necessity of having a precise and extremely short gap length for each recording/reproducing gap in the multichannel head unit which is to record or reproduce high frequency signals, preferably with all of the recording/reproducing gaps substantially aligned. The present invention is directed to a novel method of making a multichannel magnetic head unit which satisfies this requirement and thus makes possible the simultaneous magnetic recording or reproduction of extremely high frequency signals on adjacent channels of a multichannel magnetic record member moving at a reasonable speed.

In addition, in accordance with the present invention there is provided a multichannel magnetic head unit adapted to record or reproduce with good resolution extremely high frequency signals on one or more channels of a multichannel record and to record or reproduce substantially lower frequency signals at high amplitude on one or more adjacent channels on the same record. Thus, for example, certain channels of a multichannel magnetic head unit made in accordance with this invention may be used for the recording and reproduction of extremely high frequency signals, utilizing an extremely short transducing gap, while in other channels of the same head unit a considerably longer transducing gap may be used, thereby to some extent sacrificing high resolution in favor of higher amplitude.

It is also an object of the present invention to provide a novel method of making a multichannel magnetic head unit for the multichannel recording and reproduction of extremely high frequency signals.

It is a further object of this invention to provide a novel method of making a multichannel magnetic head unit which establishes a precise short gap length at the recording/reproducing gap in each of several individual heads in the unit.

Another object of this invention is to provide a novel method of making a multichannel magnetic head unit in which one or more of the individual heads in the unit has a precise short gap length for recording and/or reproducing high frequency signals with good resolution and one or more of the other individual heads in the unit may have a longer gap length for recording and/or reproducing substantially lower frequency signals at high amplitude.

The foregoing objects are accomplished in the preferred embodiment of the invention by providing a first half of the unit made up of individual pole pieces held rigidly in side-by-side relation and having front edge faces on their pole tips substantially aligned, positioning complementary pole pieces in confronting relation to the rigidly held pole pieces, individually spring loading these complementary pole pieces to position their pole tips in closely spaced relation to the pole tips on the first pole pieces and separated therefrom exactly by the thickness of the non-magnetic shims between them, and securing the parts in this position.

The preferred embodiment of the present invention is described in detail hereinafter with reference to the accompanying drawings.

Figures 1, 2, 5:
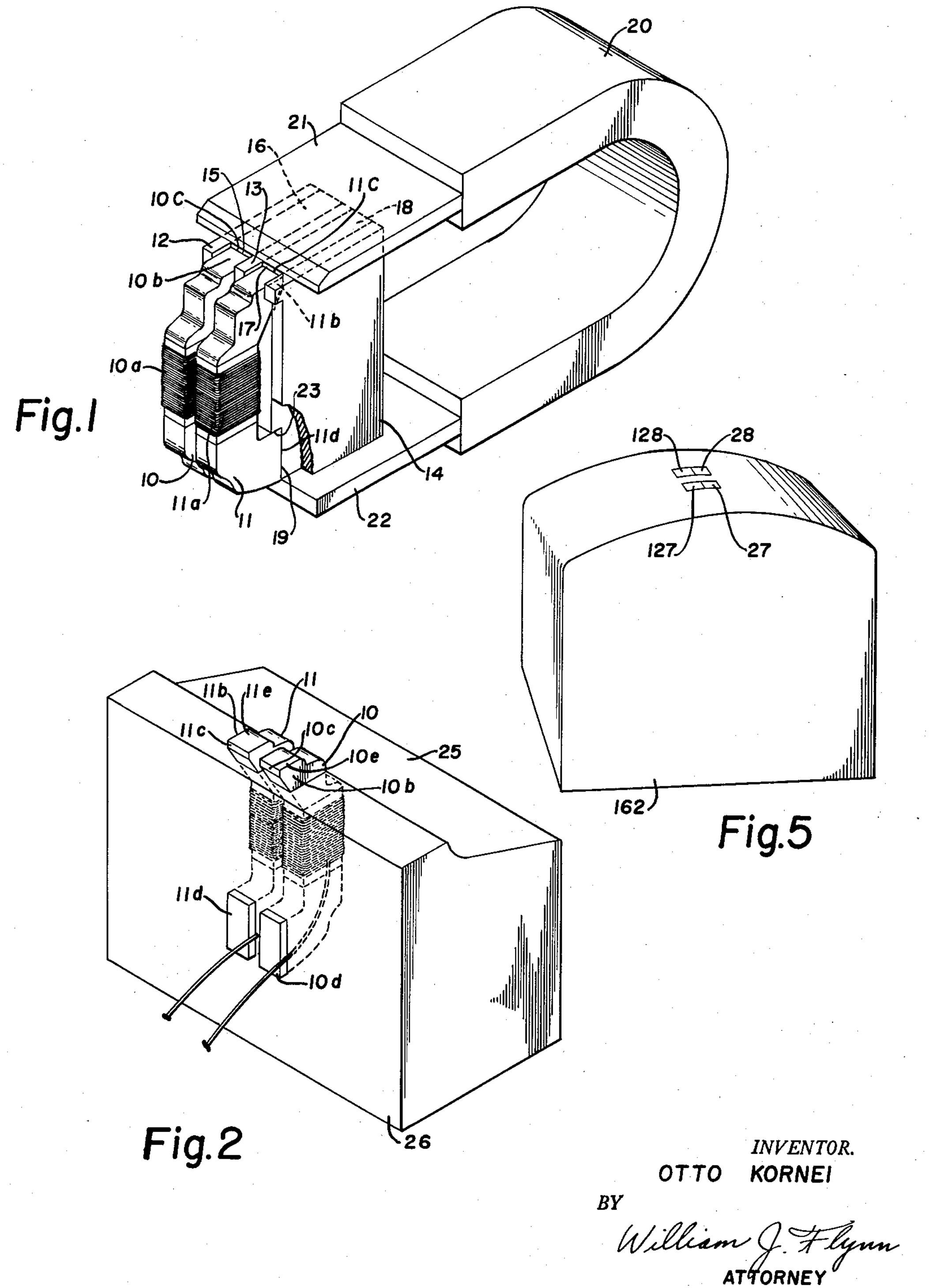
FIGURE 1 is a perspective view illustrating schematically the positioning of pole pieces in a fixture before casting resin about them to make up the first half of the present multichannel head unit.
FIGURE 2 is a perspective view of the first half of the head unit.
FIGURE 5 is a perspective view of the completed multichannel head unit.

In the first step of assembling the present head unit the pole pieces making up one-half of each individual head in the unit are cast in place in side-by-side relation. To this end there is provided a fixture for holding these pole pieces in the proper position while the resin is being cast about the pole pieces. Referring to FIG. 1, the two generally C-shaped ferrite pole pieces 10 and 11 having signal windings **10*a* and 11*a*, respectively, thereon are positioned in spaced side-by-side relation between non-magnetic stainless steel plates 12, 13 and 14. These spacer plates are generally L-shaped and engage the pole pieces 10 and 11 only at the pole tip extremities 10*b* and 11*b***, respectively.

The front end face **10*c* of the pole tip extremity 10*b* on pole piece 10 abuts against a flat reference surface 15 on a non-magnetic stainless steel plate 16 clamped between plates 12 and 13. Similarly, the front end face 11*c* of the pole tip extremity 11*b* on pole piece 11 abuts against a flat reference surface 17 on a non-magnetic stainless steel plate 18 clamped between plates 13 and 14. The end face 11*d* at the opposite extremity of pole piece 11 abuts against a flat reference surface 19 on plate 18. The corresponding end face on pole piece 10 abuts against a similar reference surface on plate 16**.

The pole pieces 10 and 11 are held in these positions magnetically by means of a permanent magnet 20 and upper and lower magnetic plates 21 and 22 which overlie and underlie, respectively, the assembly of the non-magnetic plates 12, 16, 13, 18 and 14. The upper magnetic plate 21 terminates adjacent the pole tip extremities **10*b* and 11*b* and the lower magnetic plate 22 terminates adjacent the other ends of the pole pieces. The magnetic attraction exerted by both plates pulls the pole pieces 10 and 11** up against the reference surfaces on the fixture, so that the end faces on the pole pieces are held in substantially co-planar alignment.

The reference surface 19 on plate 18 terminates at a transverse protruding shoulder 23 against which the inner side of the pole piece 11 is positioned, so as to properly locate this pole piece in the vertical direction in FIG. 1. Plate 16 is formed with an identical shoulder (not shown) for similarly locating pole piece 10.

With the parts in this position, the fixture and the pole pieces 10, 11 are placed in a suitable mold and suitable resin is poured into the mold. Upon hardening of the resin, the mold and the fixture are removed, leaving a cast half-head as shown in FIG. 2. The pole pieces 10 and 11 are embedded in the resin block except at their extremities. The pole tip extremities **10*b* and 11*b* project well above the top of the resin block and their front end faces 10*c* and 11*c* are disposed forwardly of the front face 26 on the block. Also, the opposite end faces 10*d* and 11*d* on the pole pieces are disposed forwardly of the front face 26** on the block.

The upper faces **10*e* and 11*e*** on the pole tip extremities are then lapped to bring them into precise co-planar relationship.

Following this, pole shoes 27 and 28 (FIG. 3) of high permeability metal are secured by adhesive to the upper faces **10*e* and 11*e*** of the respective pole pieces to provide a core structure as disclosed and claimed in United States Letters Patent 2,711,945 to me.

Then, the unit is lapped to bring the front edge faces of the pole shoes 27 and 28 in co-planar alignment with each other and with the faces **10*d* and 11*d* on the opposite ends of pole pieces 10 and 11**, respectively.

Complementary individual, generally C-shaped pole pieces 110 and 111 are provided which are identical in construction to the embedded pole pieces 10 and 11. The pole pieces 110 and 111 are not supported in a unitary structure at this time, however. Metal pole shoes 127 and 128 are secured to the pole tip extremities of the individual pole pieces 110 and 111 and are lapped to make them co-planar with each other and with the opposite end faces on these pole pieces.

The non-magnetic shim material which defines the length of the recording/reproducing gap between the adjacent confronting end faces of each pair of pole shoes preferably is applied by vapor deposition under vacuum, as disclosed in my copending application Serial No. 442,940, filed July 13, 1954, now Patent No. 2,866,011. In one practical embodiment, this is accomplished by exposing these faces of the pole shoes under a vacuum of the order of $10^{-3}$ mm. to $10^{-5}$ mm. of mercury to the vapor of the shim material heated by a tungsten filament. Preferably, the shim material is silicon monoxide. Half the desired shim thickness is deposited on each pole shoe end face. In one practical embodiment, for each individual head intended for the recording or reproduction of extremely high frequency signals, the total shim thickness is .5 micron (about 20 micro-inches).

Following this, the pole pieces 110 and 111 are engaged by non-magnetic blocks 130 and 131, which are attached to the free ends of individual cantilevered leaf springs 132 and 133, respectively. These springs are formed integral with a flat mounting segment 134 tightly secured in a slot 135 in a non-magnetic base block 136.

The resin block 25 holding the pole pieces 10 and 11 is secured in place on base block 136 so that the respective pairs of pole pieces 10, 110 and 11, 111 are in confronting relation. Spring 132 exerts sufficient force on pole piece 110 to maintain the vacuum-deposited shim material on the front end face of pole shoe 127 in tight engagement with the vacuum-deposited shim material on the confronting front end face of pole shoe 27, so that the non-magnetic gap length between these confronting pole shoes is precisely equal to the total thickness of the shim material deposited on both. Spring 133 performs the same function for the head made up of pole pieces 11, 111 and corresponding pole shoes 28, 128.

Since the springs act independently, each insures the precise gap length for its head, even if the front end faces of the pole shoes 27, 28 on the cast half-head unit are slightly out of co-planar alignment.

The lead wires 150, 151, 152 and 153 for the coils on the respective pole pieces are connected to terminal posts 154, 155, 156 and 157, respectively, mounted in base block 136.

Figure 3:
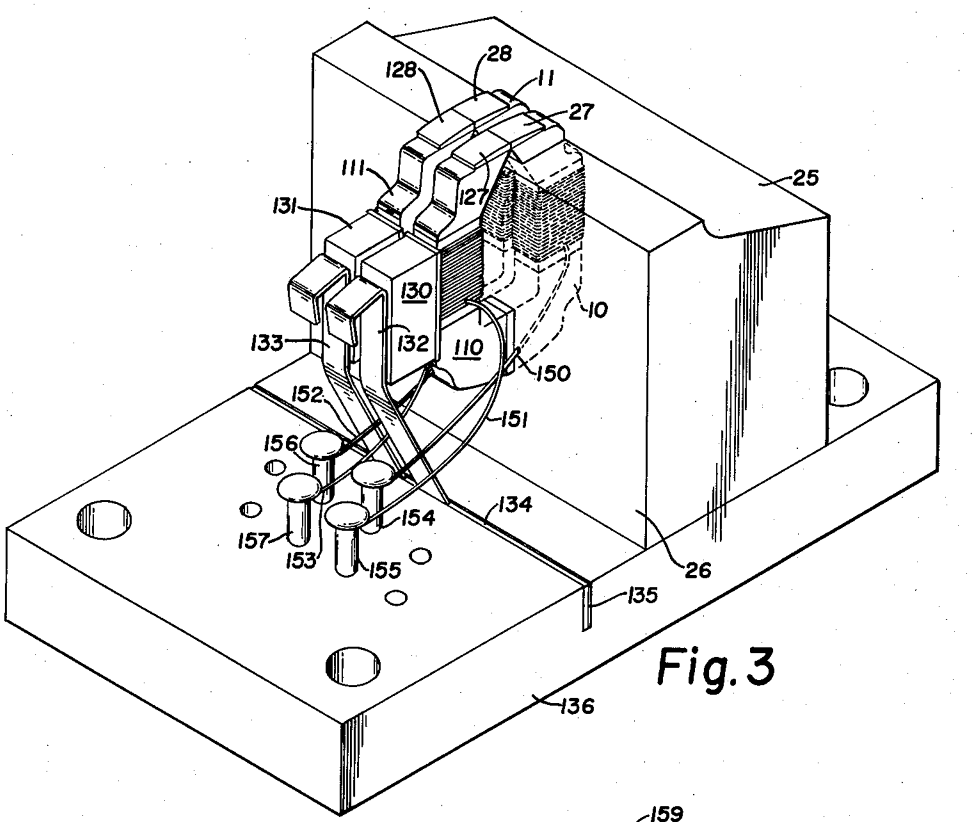
FIGURE 3 is a perspective view showing the first half of the head unit and the individually spring-loaded complementary pole pieces mounted in confronting relation thereto.
Figure 4:
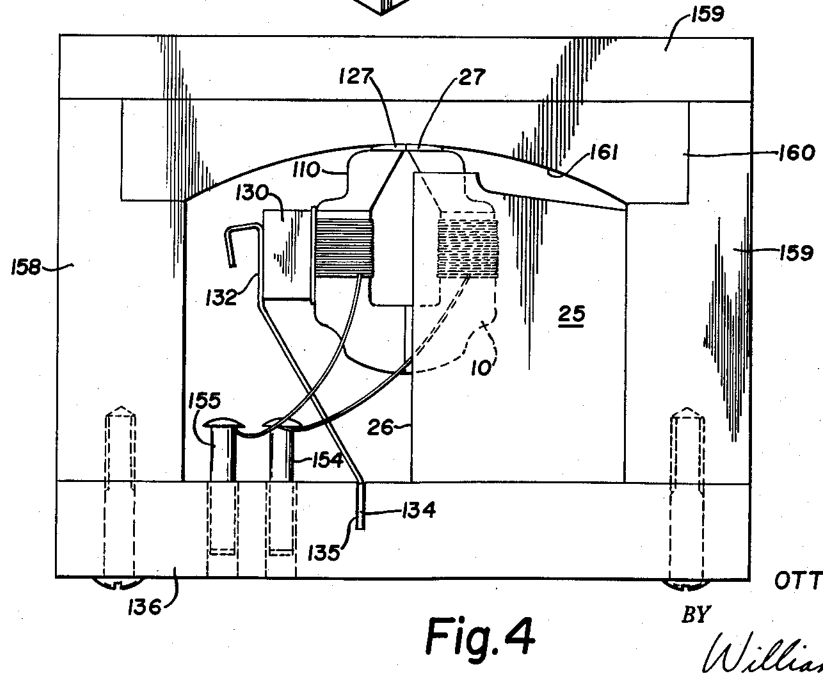
FIGURE 4 is an end view of the same assembly positioned in the mold just before the final casting.

The assembly of FIG. 3 is placed in a mold assembly as shown in FIG. 4, with the base block 136 acting as one wall of the mold. End walls 158 and 159 extend from either end of base block 136 and the opposite side of the mold assembly is provided by an outer plate 159 and a block 160 which has a curved inner face 161 which lies contiguous to the outer faces of the pole shoes 27, 28, 127 and 128, respectively.

The mold cavity is filled with a suitable resin which hardens into a block 162 (FIG. 5) completely surrounding the cast half-head made up of block 25 and pole pieces 10, 11 and the spring-loaded pole pieces 110, 111. The springs 132 and 133 maintain the pole shoes 127, 128 tight against the corresponding pole shoes 27, 28 while the resin is hardening to maintain the desired precise gap length in each head.

Preferably, the casting is carried out in such a manner as to provide a void between the confronting pole pieces, so that in the event of thermal expansion of the casting resin after initially hardening, as described, there is no likelihood of the pole tips being spread apart due to such expansion.

After the resin hardens the mold is disassembled, including the base plate 136, which leaves the terminal posts 154—157 exposed for connection to external circuits. The mounting segment 134 for the springs 132 and 133 may be cut off since the hardened resin now maintains the parts in the desired position.

From the foregoing it will be apparent that the described process accomplishes effectively the purposes of the present invention and yields a novel multichannel magnetic head having a plurality of substantially aligned recording/reproducing gaps of extremely precise short gap length.

For some applications it may be desirable to have one or more channels in the head unit record and/or reproduce extremely high frequency signals, such as in the megacycle range, and the other channels record and/or reproduce considerably lower frequency signals. For the higher frequency signal channels, good resolution is attained by the provision of a precise short gap length in each channel, as described above. For the lower frequency channel or channels, a high amplitude level is important and an extremely short gap length is not required for adequate resolution. Accordingly, the gap length in the lower frequency channel or channels of the head unit will be considerably longer than in the higher frequency channels. A multichannel head unit constructed in accordance with the present invention is particularly adapted for such applications since the pole pieces of the individual heads making up the unit are individually spring-loaded. Therefore, the gap length in each channel is accurately determined by the particular shim thickness there, even though the shim thickness for the lower frequency channel may be several times the shim thickness for an adjacent higher frequency signal channel.

While there has been described herein and illustrated in the accompanying drawings a particular embodiment of the present invention, it is to be understood that the invention is susceptible of various modifications, omissions and refinements which depart from the disclosed embodiment without departing from the spirit and scope of this invention. The two-channel embodiment has been shown in order to simplify the disclosure. It will be obvious, however, that the principles of the present invention are applicable to multichannel heads having any desired number of channels.

I claim:

1. A method of making a multichannel magnetic head unit which comprises the steps of: rigidly holding in place and with respect to each other a plurality of magnetic pole pieces with their exposed transducing pole tips aligned in a common plane, mounting a complementary plurality of magnetic pole pieces in confronting relation individually to the first-mentioned pole pieces, resiliently pressing the pole tips of said complementary plurality of pole pieces individually against the pole tips of the first plurality of pole pieces, and securing together by a plastic casting operation the assembly of pole pieces in this position.

2. A method of making a multichannel magnetic head unit which comprises the steps of: casting rigidly in side-by-side relation a plurality of magnetic pole pieces presenting pole tips having exposed front faces in substantial co-planar alignment, mounting complementary magnetic pole pieces in confronting relation individually to the first-mentioned pole pieces, individually spring-loading said complementary pole pieces toward the first-mentioned pole pieces to position the pole tips of said complementary pole pieces against the pole tips of the first mentioned pole pieces, casting hardenable material about the assembly of pole pieces in their spring-loaded condition to provide an integral multichannel magnetic head, and causing said casting material to harden.

3. A method of making a multichannel magnetic head unit which comprises the steps of: casting in hardenable resin a plurality of generally C-shaped magnetic pole pieces in side-by-side relation with their pole tips having front faces exposed and in substantially co-planar alignment, causing said resin to harden, thereafter mounting complementary magnetic pole pieces in confronting relation individually to the first-mentioned pole pieces to form individual ring cores therewith, individually spring-loading said complementary pole pieces to bias the pole tips on said complementary pole pieces against the pole tips on the first-mentioned pole pieces, and casting hardenable resin about the biased assembly of confronting pairs of pole pieces to provide an integral unit and causing said last-mentioned resin to harden.

4. A method of making a multichannel magnetic head unit which comprises the steps of: holding rigidly in side-by-side relation a plurality of magnetic pole pieces having transducing pole tips with co-planar front faces, mounting complementary magnetic pole pieces with pole tips in confronting relation individually to the first mentioned pole pieces to form therewith individual head cores, placing a non-magnetic shim between the pole tips of each pair of confronting pole pieces with the thickness of at least one of said shims being substantially different from the thickness of another of said shims, individually spring-loading said complementary pole pieces toward the first-mentioned pole pieces to position the pole tips of said complementary pole pieces against the pole tips of the first-mentioned pole pieces and separated therefrom by the respective shims, and securing together the assembly of confronting pole pieces, shims and springs in this position by casting hardenable plastic material in engagement therewith and causing said plastic material to harden.

References Cited in the file of this patent

UNITED STATES PATENTS

| | | |
|---|---|---|
| 2,685,618 | Rettinger | Aug. 3, 1954 |
| 2,769,036 | Selsted | Oct. 30, 1956 |
| 2,769,866 | Kornei | Nov. 6, 1956 |

FOREIGN PATENTS

| | | |
|---|---|---|
| 699,885 | Great Britain | Nov. 18, 1953 |